United States Patent [19]

Leake et al.

[11] Patent Number: 5,405,437
[45] Date of Patent: Apr. 11, 1995

[54] ALL NATURAL, STARCH-BASED, WATER RESISTANT CORRUGATING ADHESIVE

[75] Inventors: Craig H. Leake, Edison; Michael T. Foran, Somerville; Roger Jeffcoat, Bridgewater; Michael T. Philbin, Somerville, all of N.J.; John E. Fannon, Denver, Colo.

[73] Assignee: National Starch and Chemical Investment Holding Corporation, Wilmington, Del.

[21] Appl. No.: 71,419

[22] Filed: Jun. 1, 1993

[51] Int. Cl.⁶ .................................................. C08L 3/00
[52] U.S. Cl. ...................................... 106/210; 106/213
[58] Field of Search .................................. 106/210, 213

[56] References Cited

U.S. PATENT DOCUMENTS

| | | | |
|---|---|---|---|
| 3,222,220 | 12/1965 | Wurzburg | 106/213 |
| 3,284,381 | 11/1966 | Hickey et al. | 260/17.3 |
| 3,477,903 | 11/1969 | Semegran et al. | 161/266 |
| 3,532,648 | 10/1970 | Wilhelm | 260/17.2 |
| 3,728,141 | 4/1973 | Ray-Chaudhuri et al. | 106/213 |
| 3,944,428 | 3/1976 | Schoenberg et al. | 106/213 |
| 4,009,311 | 2/1977 | Schoenberg | 428/182 |
| 4,329,181 | 5/1982 | Chiu et al. | 106/213 |
| 4,366,275 | 12/1982 | Silano et al. | 524/47 |
| 4,374,217 | 2/1983 | Miyake et al. | 106/213 |
| 4,775,706 | 10/1988 | Iovine et al. | 524/47 |
| 4,787,937 | 11/1988 | Leake | 106/213 |
| 4,838,944 | 6/1989 | Kruger | 127/71 |
| 4,912,209 | 3/1990 | Leake et al. | 106/213 |
| 5,055,503 | 10/1991 | Leake et al. | 524/30 |
| 5,079,067 | 1/1992 | Willging | 428/182 |
| 5,190,996 | 3/1993 | Foran et al. | 524/28 |
| 5,236,977 | 8/1993 | Eden et al. | 524/49 |

FOREIGN PATENT DOCUMENTS 0533031 3/1993 European Pat. Off. .
1464191 12/1965 France .

*Primary Examiner*—Mark L. Bell
*Assistant Examiner*—Paul Marcantoni
*Attorney, Agent, or Firm*—Eugene Zagarella, Jr.

[57] ABSTRACT

An all natural, starch-based, alkaline corrugating adhesive free of formaldehyde and other crosslinking and water resistance additives and having good water resistant properties comprising an aqueous dispersion of a gelatinized carrier starch and a raw ungelatinized starch wherein the carrier starch has a total amylose content of greater than 60% by weight and the gelatinized starch amylose content is at least about 15% by weight of the total starch content in the adhesive.

33 Claims, No Drawings

ALL NATURAL, STARCH-BASED, WATER RESISTANT CORRUGATING ADHESIVE

BACKGROUND OF THE INVENTION

This invention relates to an all natural, starch-based corrugating adhesive providing water resistance without containing water resistance additives or chemical crosslinkers. More particularly, this invention is directed to a corrugating adhesive composition comprising an aqueous dispersion of a selected gelatinized carrier starch and a raw ungelatinized starch wherein the carrier starch has an amylose content of greater than 60% by weight and the cooked or gelatinized amylose content is at least about 15% by weight of the total starch content in the adhesive.

The procedure employed in the production of corrugated paperboard usually involves a continuous process whereby a strip of paperboard is first corrugated by means of heated, fluted rolls. The protruding tips on one side of this fluted paperboard strip are then coated with an adhesive, and a flat sheet of paperboard, commonly known in the trade as a facing, is thereafter applied to these tips. By applying heat and pressure to the two paperboard strips thus brought together, an adhesive bond is formed between the strips. The above-described procedure produces a single-faced board in that the facing is applied to only one surface thereof. If a double-faced paperboard in which an inner fluted layer sandwiched between two facings is desired, a second operation is performed wherein the adhesive is applied to the exposed tips of the single-faced board and the adhesive-coated tips are then pressed against a second facing in the combining section of the corrugator under the influence of pressure and heat. The typical corrugating process and the operation and use of corrugators in general are described in U.S. Pat. Nos. 2,051,025 and 2,102,937 issued on Aug. 18, 1936 and Dec. 31, 1937 respectively to Bauer.

A major concern in such corrugating processes is the selection of the appropriate adhesive, as its properties will affect not only the strength and stability of the final corrugated product, but also the parameters, such as corrugator speed, within which the process can be operated. Thus, such adhesives are chosen in light of the specific requirements of the process and the properties desired in the ultimate corrugated paperboard. The adhesives most commonly used in corrugating are starch-based adhesives which are popular because of their desirable adhesive properties, low cost and ease-of preparation.

The most fundamental of starch corrugating adhesives is an alkaline adhesive which is comprised of raw ungelatinized starch suspended in an aqueous dispersion of cooked starch (carrier). The adhesive is produced by gelatinizing starch in water with sodium hydroxide (caustic soda) to yield a primary mix of gelatinized or cooked carrier, which is then slowly added to a secondary mix of raw (ungelatinized) starch, borax and water to produce the fully formulated adhesive. In the corrugating process, the adhesive is applied (usually at between 25° and 55° C.) to the tips of the fluted paper medium or single-faced board, whereupon the application of heat causes the raw starch to gelatinize, resulting in an instantaneous increase in viscosity and tack and formation of the adhesive bond.

It is often desired or necessary in the manufacture of corrugated paperboard that the adhesive yield water resistant bonds which can withstand extended exposure to high humidity, water, melting ice and the like. A number of approaches have been devised to produce water resistant corrugating adhesives. One method involves preparation of an acidic, starch-based adhesive wherein urea-formaldehyde together with an acidic catalyst is added to the composition to produce a crosslinked starch and provide water resistant bonds in corrugated board. Another more commonly followed method involves the use of alkaline curing starch-based adhesives wherein formaldehyde-based chemicals are added as crosslinking additives to produce water resistant bonds.

It has been known for many years that a corrugating adhesive whose carrier portion is prepared from a high amylose starch (i.e., at least 35 to 40% amylose) is superior to one prepared from pearl starch, which contains about 27% amylose, because a carrier can be produced having improved rheological and film-forming properties, and increased moisture resistance. However, despite this knowledge, the ability to provide useful water resistant starch-based corrugating adhesives has been primarily directed to compositions containing synthetic additives, formaldehyde-based crosslinkers or other starch crosslinking agents. This is true with alkaline corrugating adhesives containing high amylose carrier starches which provide little or no water resistance when used without crosslinking additives. In other words, to get significant or reasonable amounts of water resistance even when using high amylose starches, crosslinking additives have been required.

Starch-based corrugating adhesives containing high amylose carrier starch and providing improved and superior green bond strength and tack are disclosed in U.S. Pat. No. 4,787,937 issued Nov. 29, 1988 to C. Leake. High amylose starches are also disclosed in U.S. Pat. No. 4,912,209 issued Mar. 27, 1990 to C. Leake et al., as being useful carrier starches in corrugating adhesives providing faster bond development and higher corrugator running speeds.

The use of high amylose starch in water resistant corrugating adhesives has been disclosed in U.S. Pat. Nos. 3,284,381 issued to L. Hickey et al. on Nov. 3, 1966 and 3,532,648 issued to D. Wilhelm on Oct. 6, 1970. However both references require the use of chemical crosslinkers commonly based on formaldehyde to provide desired water resistance. Other patents which disclose the use of crosslinking agents or other water resistance additives include U.S. Pat. No. 3,728,141 issued Apr. 17, 1973 to D. Ray-Chaudhuri et al. involving the use of a diacetone acrylamide-formaldehyde condensate, U.S. Pat. No. 3,944,428 issued Mar. 16, 1976 to J. Schoenberg et al. which is directed to an acetoacetamide-formaldehyde condensate and U.S. Pat. No. 4,009,311 issued Feb. 22, 1977 to J. Schoenberg which shows the reaction product of a ketone, formaldehyde and a secondary amine as a crosslinking agent.

More recently, due to the uncertainty of the safety of formaldehyde, efforts have been made to reduce the levels of exposure to formaldehyde. U.S. Pat. No. 4,366,275 issued on Dec. 28, 1982 to M. Silano et al. employs an acetone-formaldehyde condensate crosslinking additive low in free formaldehyde in an alkaline corrugating adhesive. U.S. Pat. No. 5,079,067 issued on Jan. 7, 1992 to S. Willzing discloses that the levels of free formaldehyde in alkaline starch containing corrugating adhesives can be reduced by reacting the free formaldehyde with a nitrogen base and urea.

Other patents disclose water resistant corrugating adhesives which use additives that are formaldehyde free. These patents include U.S. Pat. No. 4,775,706 issued Oct. 4, 1988 to C. Iovine et al. which uses a latex polymer of a halohydrin quaternary ammonium monomer, U.S. Pat. No. 5,055,503 issued Oct. 8, 1991 to C. Leake et al. disclosing a polysaccharide graft copolymer containing a reactive aminoethyl halide group and U.S. Pat. No. 5,190,996 issued Mar. 2, 1993 to M. Foran et al. showing an epihalohydrin-amine condensate crosslinking agent.

Despite the advances made to reduce or eliminate the level of formaldehyde exposure, the corrugating industry is still searching for effective means of providing water resistance to corrugated paperboard products using formaldehyde-free alkaline curing starch-based adhesives.

Accordingly, it is an object of the present invention to provide a water resistant, all natural (i.e. without crosslinkers), formaldehyde free, alkaline starch-based adhesive composition which is useful in the manufacture of corrugated paperboard and in which the water resistance is developed solely through the starch and does not rely on the addition of synthetic crosslinkers.

SUMMARY OF THE INVENTION

It has now been found that an all natural, starch-based, alkaline corrugating adhesive free of formaldehyde and other crosslinking and water resistance additives and having good water resistant properties is provided by a composition comprising an aqueous dispersion of a selected gelatinized carrier starch and a raw ungelatinized starch wherein the carrier starch is a high amylose starch having greater than 60% by weight of amylose content and further where the gelatinized starch amylose content is at least about 15% by weight of the total starch content in the adhesive composition.

In one preferred embodiment, the high amylose carrier starch used in the corrugating adhesive is a substantially pure starch extracted from a plant source having an amylose extender genotype, the starch comprising less than 10% amylopectin determined by butanol fractionation/exclusion chromatography measurement.

In another preferred embodiment, the high amylose carrier starch used is a degraded starch, particularly one obtained in a controlled process employing hydrogen peroxide and a manganese salt catalyst in an alkaline slurry reaction.

DETAILED DESCRIPTION OF THE INVENTION

The alkaline corrugating adhesive composition of this invention comprises a raw ungelatinized starch, a gelatinized or cooked carrier starch, an alkali base material and water.

The carrier starch component used in this corrugating adhesive is a selected high amylose starch having greater than 60% and preferably at least about 70% by weight total amylose content, i.e. including normal amylose and low molecular weight amylose. When used throughout the application, the term "amylose" by itself refers to total amylose which includes both normal amylose and low molecular weight amylose. It is well known that starch is composed of two fractions, the molecular arrangement of one being linear and the other being branched. The linear fraction is known as amylose and the branched fraction amylopectin. Starches from different sources, e.g. potato, corn, tapioca, and rice, etc., are characterized by different relative properties of amylose and amylopectin components. Some plant species have been genetically developed which are characterized by a large preponderance of one fraction over the other. For instance, certain varieties of corn which normally contain about 22–28% amylose have been developed which yield starch composed of over 40% amylose. These hybrid varieties have been referred to as high amylose or amylomaize.

While high amylose corn hybrids were developed in order to naturally provide starches of high amylose content for commercial applications, other starches which are useful include those derived from any plant species which produces or can be made to produce a high amylose content starch, e.g., corn, peas, barley and rice.

Besides having the high amylose content noted above, the starch used as the carrier component in the corrugating adhesive of this invention will preferably have a weight average molecular weight of from about 300,000 to 1,200,000 more preferably from about 400,000 to 1,000,000 and even more preferably from about 500,000 to 850,000 determined using gel permeation chromatography (GPC). Additionally, the carrier starch is characterized by having an amylopectin content, as defined by a weight average molecular weight greater than about 1,500,000 by gel permeation chromatography (GPC), of less than about 40%, preferably less than about 30% and more preferably less than about 20%, and a low molecular weight amylose content, as defined by a GPC peak molecular weight of about 15,000 of from about 5 to 30%, preferably from about 8 to 25%, all determined on the fractionated components.

While any starch having the characteristics of amylose content and preferably the molecular weight, as described herein, may be used as the carrier starch component, particularly useful is an ae starch or substantially pure starch extracted from a plant source having an amylose extender genotype, the starch comprising less than 10% amylopectin. Another especially useful starch is a degraded starch and particularly one obtained in a controlled process employing hydrogen peroxide and a manganese salt catalyst in an alkaline slurry reaction.

The ae starch which is useful as the carrier starch is derived from a plant breeding population, particularly corn, which is a genetic composite of germplasm selections and comprises at least 75% amylose, optionally at least 85% amylose (i.e. normal amylose) as measured by butanol fractionation/exclusion chromatography techniques. The starch further comprises less than 10%, optionally less than 5%, amylopectin and additionally from about 8 to 25% low molecular weight amylose. The starch is preferably extracted in substantially pure form from the grain of a starch bearing plant having a recessive amylose extender genotype coupled with numerous amylose extender modifier genes. This ae starch and the method of preparation are described in copending application Ser. No. 937,794 filed Aug. 28, 1992, which is incorporated herein by reference.

The starch used in producing the carrier ae starch is preferably obtained from a modified ae maize population. However, starches from other plant sources may be suitable for use in this invention, and starch compositions blended or formulated from more than one starch source are also suitable for use herein, provided that the composition is adjusted to the appropriate ratios of amylose, amylopectin and low molecular weight amylose. The ae genotype plant from which the plant is extracted may be obtained by standard breeding techniques or by translocation, inversion or any other method of chromosome engineering to include variations thereof whereby the desired properties of the starch are obtained. Any plant source which produces starch and which can breed to produce a plant having ae homozygous genotype may be used.

In another embodiment of this invention, the starch carrier may be a degraded or converted starch produced by techniques such as acid conversion, oxidation, pyroconversions and enzyme conversion, all of which are conventional and well known in the art.

One particularly preferred method of obtaining the converted or degraded starch carrier involves a process employing hydrogen peroxide and a catalytic amount of manganese ions in an alkaline slurry reaction. In carrying out this process a granular starch slurry is provided, ordinarily at 20-50% solids, and the pH is raised to about 11.0 to 12.5, preferably 11.5 to 12.0, with sodium hydroxide. In order to achieve improved retention rates when using slurry temperatures below about room temperature, (e.g., 0°-20° C.), it is preferable that the pH level be maintained at the upper portion of the designated useful pH range (pH 11.8-12.5). Sufficient potassium permanganate or other source of manganese ions is added with stirring to the slurry to provide a concentration of about 1 to 80 ppm (parts per million) of manganese ions based on the amount of starch solids. If desired, the manganese ions can be added to the slurry prior to the pH adjustment. The manganese ions catalyze the hydrogen peroxide/starch reaction so that a desired amount of degradation (thinning) of the granular starch can be effected in a substantially shorter reaction period as opposed to a reaction without manganese ions. Temperatures ranging from about 0°-55° C. can be used in reacting the starch but a range of about 22°-45° C. is most practical and preferred in the process with the higher temperatures requiring less time for completion of the reaction. With most starches, the temperature should not be allowed to go much above 50° C. because of the possible initiation of gelatinization. Hydrogen peroxide is introduced into the slurry with the full amount added at once or preferably divided into several portions (5 to 6 or more with larger amounts of peroxide) and added at about one-hour intervals. The amount of hydrogen peroxide employed is from 0.01 to 3.0%, anhydrous, preferably 0.05 to 1.5%, based on starch solids. The reagent is ordinarily introduced by the addition of sufficient 20-35% aqueous hydrogen peroxide as is commonly supplied in commerce. The practitioner can easily determine the details of the preferred manner of addition of any of the reaction components.

The agitated slurry is usually held for a total of 4-18 hours at the designated temperature after the first addition of the hydrogen peroxide. In some cases reaction periods of 2 hours or less may be adequate. In cases of very high degradations and/or low temperatures, the reaction period may be extended to as much as 36 hours. Samples of the slurry can be taken at periodic intervals and the viscosity of the starch determined to monitor the progress of the starch degradation, with Ford Cup viscosities of about 10 to 180 seconds, preferably about 10 to 100 seconds and more preferably about 10 to 60 seconds being particularly desirable. When the desired level of starch degradation is reached, a reducing agent for example, sodium bisulfite or sodium metabisulfite, can be added to remove any excess hydrogen peroxide.

In a variation of the described procedure, a portion, about one-third or one-quarter of the hydrogen peroxide estimated or calculated to be needed to reach the desired degradation, can be added to the slurry, allowing time for its reaction with the starch. After the addition of 2 or 3 such portions the degree of starch degradation can be determined and additional hydrogen peroxide is added as needed or the reaction can be terminated. In this variation the peroxide increments are reacted as they are added and better control of the degradation end-point can be achieved. A potassium iodide spot test can be used to confirm the presence or absence of hydrogen peroxide in the test slurry.

When the desired degradation is reached, the slurry is adjusted to a pH level of 5.0-6.0 using dilute hydrochloric acid or other common acid and filtered. The filter cake is optionally washed with water, refiltered and dried in any conventional manner.

In addition to the use of potassium permanganate, which is preferred, other manganese salts may be used as well, provided they are sufficiently water-soluble to supply the necessary catalytic concentration of manganese ions. Thus also useful for example, are: manganous nitrate and manganous sulfate. The amount of manganese ions needed to promote the degradation is from about 1-80 ppm, preferably 3-50 ppm, based on starch solids. Amounts less than 1 ppm do not appear to hasten the reaction significantly while amounts of 55 to 60 ppm or more tend to yield lower reaction efficiencies as compared to the efficiencies obtained using 5-50 ppm.

Further description of this process and the components and conditions used in carrying it out are disclosed in U.S. Pat. No. 4,838,944 issued Jun. 13, 1989 and which is incorporated herein by reference.

The high amylose starch used in the carrier starch component, as disclosed herein, may comprise the entire starch portion of that component or it may comprise a blend of at least about 25% and preferably at least about 50% by weight of high amylose starch with other starches suitable for use in corrugating adhesives. These blends are useful as long as the defined characteristics of the carrier component, i.e. having a total amylose content of greater than 60% by weight and other characteristics as described herein, are satisfied. These other starches as well as the starch in the raw component may be selected from the several starches, native or converted, heretofore employed in starch corrugating adhesive compositions including corn, potato, waxy maize, sorghum, wheat and tapioca. Suitable starches, include, for example, those starches as well as high amylose starches and the various derivatives of these starches. Hence, the applicable starches which are useful in the compositions of this invention as either carrier or raw starch include derivatives such as ethers, esters, thin boiling types prepared by known processes such as mild acid treatments, enzyme conversion, oxidation, etc and other starches typically employed in corrugating adhesives. The carrier starch may be a granular starch, a pre-gelatinized or cold water swellable starch or a partially pre-gelatinized starch.

While the starch content can vary depending on several factors such as the intended end use application and the type of starch used, it is important that the amount of amylose in the gelatinized or cooked carrier starch comprise at least 15% by weight, preferably from about 15 to 50% and more preferably from about 18 to 40% by weight of the total starch content in the adhesive. The total amount of starch employed including the gelatinized or cooked carrier and the ungelatinized raw starch will typically be in the range of about 10 to 50% by weight, based on the weight of the composition. The ratio of the raw starch to carrier will vary depending on properties desired and generally will range from about 1:1 to 10:1 depending on the nature of the starch and viscosity desired.

While the corrugating adhesive composition as described herein is primarily directed to the particularly preferred embodiment of a composition comprising a carrier starch and a raw starch, it may also include a no carrier composition having just a single starch component comprising an ungelatinized starch which upon subsequent treatment with alkali becomes partially swollen. This single starch composition will comprise high amylose starch i.e. starch having a total amylose content of grater than 60% by weight and blends with other starches as described herein provided there is sufficient high amylose starch to provide at least 15% by weight, and preferably at least 18% by weight of amylose based on the total weight of starch in the adhesive. While varying amounts of up to 100% of amylose content can be used, typical ranges will preferably use up to 75% of amylose. The total amount of starch employed in the single starch component composition will range from about 10 to 50% by weight, based on the weight of the composition. Other components including the alkali, boron-containing salt and water will be used in amounts as otherwise described herein.

The adhesive composition also includes an alkali which is used in an effective amount sufficient to provide the adhesive with a pH greater than 7, more particularly from about 7.5 to 13 and preferably from 10 to 13. Typically this represents an amount of from about 0.3 to 5% and preferably from about 1 to 4% by weight based on the weight of the starch.

The alkali (base) employed herein is preferably sodium hydroxide; however, other bases may be used in partial or full replacement of the sodium hydroxide and include, for example, alkali metal hydroxides such as potassium hydroxide, alkaline earth hydroxides such as calcium hydroxide, alkaline earth oxides such as barium oxides, alkali metal carbonates such as sodium carbonate, and alkali metal silicates such as sodium silicate. The alkali may be employed in aqueous or solid form.

Another common ingredient of corrugating adhesives is a boron-containing salt, e.g., borax which is useful as a tackifier and which is optionally used in effective amounts of up to about 5% by weight, based on the total weight of starch. Additionally, any conventional non-chemically functional additives may be incorporated into the adhesive in minor amounts, if desired. Such additives include, for example, preservatives; defoamers; wetting agents; plasticizers; solubilizing agents; rheology modifiers; water conditioners; penetration control agents; peptizers such as urea; gelatinization temperature modifiers; inert fillers such as clay and finely ground polymers; thickeners such as inorganic colloidal clays, guar, hydroxethyl cellulose, alginates, polyvinyl alcohol, polymers of ethylene oxide and the like; colorants; and emulsions such as polyvinyl acetate.

It is further noted that while the essence of the invention is directed to a corrugating adhesive which provides improved levels of water resistance without the use of formaldehyde containing and other water resistance and crosslinking additives, the addition of such additives particularly in small amounts, may optionally be employed.

The remainder or balance of the adhesive composition will be water in an amount of from about 40 to 90% and preferably about 50 to 80% by weight, based on the total weight of the adhesives.

In the preparation of the corrugating adhesives herein, the method used by the practitioner can vary without serious consequences. Ordinarily, however, the carrier starch is first gelatinized (cooked) in a portion of the water with the alkali (caustic soda) to provide the carrier component of the adhesive. In a separate vessel, a mixture or slurry is made of the raw starch, borax (optional) and remaining water. The carrier and raw starch mixture are combined to form the final adhesive. Optional ingredients, if desired, can be added at any convenient point during the preparation of either component but are usually added to the finished adhesive.

The adhesives herein can be used to bond single- or double-faced boards using any equipment which is presently employed for the preparation of corrugated board. Thus, the adhesive is usually maintained at a temperature of between 25° and 55° C. before its application may be accomplished by the use of glue rolls which are ordinarily employed in most corrugating machines, or one may, if desired, utilize other application methods which may be able to achieve a different distribution of adhesive. Following the application of the adhesive to the fluted paper strip, the latter is then brought into immediate contact with the facing board under the influence of heat and pressure, as is well known in the art. A double-faced board may be subsequently prepared by bringing a second facing in contact with the open fluted surface of the single-faced board by the usual procedures.

Any of the various paperboard substrates may be utilized in combination with the adhesive composition of the present invention in order to provide corrugated paperboard. As the corrugating adhesive of the present invention provides water resistant properties, it is usually desirable to utilize a water resistant corrugated paperboard product. One preferred paperboard product is a wax impregnated paperboard, however, any of the various water resistant paperboard products such as e.g., resin impregnated paperboard, may be utilized in combination with the water resistant adhesive of the present invention.

The following procedures were used to evaluate the starches and corrugating adhesive compositions of this invention.

BUTANOL FRACTIONATION

The butanol fractionation methods of Adkins and Greenwood, *Carbohydrate Research*, 11:217-224 (1969) and Takeda, Hizukuri and Juliano, *Carbohydrate Research*, 148:299-308 (1986) were modified as described below and used to determine the amylose content of high amylose starches.

The starches were obtained from commercially available sources (i.e., corn, Hylon ® V corn (50% amylose) and Hylon VII corn (70% amylose) starches were obtained from National Starch and Chemical Company, Bridgewater, N.J.). Starches were also obtained by milling corn kernels from the experimental corn crops described in Example I, below. All starches (except corn) were defatted by cold soxhlet extraction with ethanol overnight.

Part I: Starches were added to 90% DMSO in water under nitrogen and stirred for 1½ hours at 65° to 70° C. to solubilize the starch. Starch was recovered by adding ethanol, placing the sample under refrigeration (4° C.) for at least 1 hour under nitrogen, and centrifuging the sample at 10,000 g ("g" is the relative centrifugal force) at 4° C. for 10-15 minutes. This process was repeated three times with the starch precipitate.

Part II: Step 1: The precipitate was dispersed in DMSO, heated to 65° C. under nitrogen, and the complexing solution (an aqueous solution of 10% 1-butanol v/v and 0.1% NaCl v/w at 65° C.) was added with stirring to the starch/DMSO dispersion. The samples were slowly cooled to refrigeration temperature (4° C.) under nitrogen and centrifuged at 5,000 to 10,000 g for 10 to 15 minutes at 4° C.

Part II: Step 2: Immediately following centrifugation, the supernatant was decanted and the precipitate (the amylose-butanol complex) was re-dissolved in distilled water (about a 0.4% starch solution) at 65°-70° C. The re-dissolved precipitate was treated with 10% butanol and 0.1% NaCl and left under refrigeration for at least 12 hours. The amylose fraction was recovered from the solution by centrifugation at 5,000 to 10,000 g for 10 to 15 minutes at 4° C. Step 2 of Part II was repeated.

The supernatant (from Part II) was treated with ethanol and/or acetone to precipitate the non-complexing starch components, refrigerated to cool to 4° C., and the supernatant was centrifuged at 10,000 g for 10 to 15 minutes at 4° C. The precipitate fractions (complexing and non-complexing) were dehydrated to a powder with an ethanol/acetone series under vacuum and oven dried at 60° C. under vacuum.

GEL PERMEATION CHROMATOGRAPHY

Starches were prepared for analysis by slurrying 10-15 mg of starch in 4 ml of dimethylsulfoxide (DMSO) containing 0.03M sodium nitrate and heating the slurry to 80° C. for 16 hours to disperse the starch. Samples (200 ul) were injected into an ALC/GPC-150C Chromatograph (Waters Associates, Milford, Mass.) (equipped with a Nelson 3000 Series Chromatography Data System and two PL gel mixed 10 um columns (Polymer Laboratory, Amherst, Mass.), employing a DMSO containing 0.03M sodium nitrate as a the mobile phase), and eluted at a rate of 1 ml/min. The columns were calibrated using dextran standards (with molecular weights of 2,000; 20,000; 80,000; 500,000; and 2,000,000, obtained from Pharmacia Fine Chemicals, Piscataway, N.J.). The percentage low molecular weight amylose was calculated from the relative area of the peak obtained within the molecular weight range from about 500 to 20,000; the percent amylose from the area of about 200,000 (in excess of 20,000 and less than 1,500,000) i.e. normal amylose; and the percent amylopectin from the area greater than 1,500,000, all determined using the butanol fractionated components.

IODINE ANALYSIS

POTENTIOMETRIC DETERMINATION

Approximately 0.5 g of a starch (1.0 g of a ground grain) sample was heated in 10 mls of concentrated calcium chloride (about 30% by weight) to 95° C. for 30 minutes. The sample was cooled to room temperature, diluted with 5 mls of a 2.5% uranyl acetate solution, mixed well, and centrifuged for 5 minutes at 2000 rpm. The sample was then filtered to give a clear solution.

The starch concentration was determined polarimetrically using a 1 cm polarimetric cell. An aliquot of the sample (normally 5 mls) was then directly titrated with a standardized 0.01N iodine solution while recording the potential using a platinum electrode with a KCl reference electrode. The amount of iodine needed to reach the inflection point was measured directly as bound iodine. The amount of amylose (total) was calculated by assuming 1.0 grams of amylose will bind with 200 milligrams of iodine.

STEIN-HALL VISCOSITY

Viscosity of the formulated adhesives was determined using a conventional Stein-Hall viscosity cup and measuring the time in seconds, required for 100 ml of the adhesive composition to pass through an orifice having a diameter of 3/32 inch.

BROOKFIELD VISCOSITY

Viscosity of the formulated adhesives was determined using a Brookfield Viscometer (model RVT) with spindle #2 at 20 rpm at approximately 100° F.

FORD CUP VISCOSITY

Viscosity of the starch carriers was determined by cooking the starch at 12.5% solids in an alkaline-borax solution then determining time it takes for 100 mls of the cooked starch to flow through a No. 4 Ford Cup orifice at 38° F.

WATER RESISTANT PROPERTIES AND DRY BOND STRENGTH

Sample adhesives were evaluated for water resistance and dry bond strength using single-faced corrugated paperboard. In the single-face operation, the medium was pretreated using steam showers and heated rolls. It was then fluted when passed between two hot (175° C.), geared corrugating rolls. Adhesive was applied to the flute tips which were then brought into contact with the liner board to form a singlefaced, C-flute web. The bonded boards were placed in a conditioning atmosphere of 22° C., 50% relative humidity for at least 24 hours, after which 2×5 inch samples and additional 2×5 samples placed in water were tested as described below.

The sample boards were evaluated for dry pin adhesion and wet pin adhesion using tests described in TAPPI Standard T 821 om-87 using a Hinde and Dauch Crush Tester obtained from Testing Machines, Inc., Mineola, N.Y. Since the pin attachments tests as 2×4 inch area, the test results record the force required to separate completely the liner from the medium in pounds per 8 square inches tested. The results are the average of 12 replicate trials.

EXAMPLE I

An ae starch having high amylose and low amylopectin content was bred as described herein and further described in application Ser. No. 937,794 filed Aug. 28, 1992. Using the butanol fractionation and gel permeation chromatography (GPC) procedures described above the starch was evaluated and shown to have the following content:

| | |
|---|---|
| amylose (normal) | 78.3% |

| | |
|---|---|
| low molecular weight amylose | 18.7% |
| amylopectin | 2.9% |

This starch, sample A, which had a weight average molecular weight of about 606,000 was further used as the carrier starch component in a corrugating adhesive composition prepared and evaluated as described below.

EXAMPLE II

A high amylose starch material having amylose content of about 70% was degraded in a process employing hydrogen peroxide and potassium permanganate as follows. To a stirred slurry of 4 kg of Hylon VII corn starch (amylose content of about 70%) in 6 l of water at 40° C., 1100 g of 3% NaOH was added to bring the titratable alkalinity to 12.5 mls (titratable alkalinity is determined by taking a 25 g aliquot and titrating with 0.1N HCl to a phenolphthalein endpoint). Ten (10) g of 2% $KMnO_4$ was added and the slurry stirred for 15 minutes. Then 2.4 g of 30% $H_2O_2$ was added and the slurry stirred for 2 hours. The pH of the slurry was lowered to 5.5 by the addition of HCl and then the slurry was filtered, washed with water and dried. The resulting degraded starch was evaluated and found to have an amylopectin content of 15.4%, a weight average molecular weight of 640,000 and a Ford Cup viscosity of 20 seconds. This and other starch samples degraded in a similar manner were used in corrugating adhesive compositions prepared and evaluated as described below in Example III.

EXAMPLE III

Several samples of corrugating adhesives were prepared in essentially the same manner, differing only in the precise starches employed and the ratios of components. A representative preparation is presented below.

A carrier starch was prepared by cooking at 60° C. (140° F.) 1500 g of high amylose starch (70% amylose) in 3750 g of water. A total of 125 g of sodium hydroxide (dissolved in 250 g of water) was then added and the system was agitated for 10 to 20 minutes. Then 3253 g of water was added to cool the system and quench the reaction.

The raw starch component was prepared in a separate vessel by combining 4200 g of corn starch with 5254 g of water at about 30° C. (90° F.) and adding 72 g of borax (pentahydrate) to provide a slurry which was agitated for 5 minutes. The carrier component was then slowly added and additional water added, if desired, to adjust viscosity. Water resistant additive was added to one of the control samples. The prepared adhesive were subsequently used and evaluated as described below in Tables 1 and 2.

TABLE 1

Starch and Adhesive Properties

| | | Carrier Starch | | | Formulated Adhesive | | | | |
|---|---|---|---|---|---|---|---|---|---|
| Sample | Type Starch | Amylose Content (%)[1] | Ford Cup Vis. (Sec.) | Wt. Average Mol. Wt. | % Starch in Water | % Cooked Amylose/Total Starch | Water Resistant Additive | Stein Hall Vis. (Sec.) | Brookfield Vis. (cP) |
| A | AE High Amylose | 84.1 | 46 | 606,000 | 29.8 | 22.13 | None | 50 | 2950 |
| B | Degraded Hylon VII | 71.6 | 20 | 640,000 | 29.8 | 18.84 | None | 47 | 2500 |
| C | Degraded Hylon VII | 67.4 | 14 | 542,000 | 31.5 | 20.22 | None | 35 | 2850 |
| D | 65/35 Blend of non-degraded Hylon VII (70% amylose) and degraded starch (65% amylose) | 70.3 | 38 | | 30.4 | 21.09 | None | 48 | 3050 |
| E | Hylon VII (non degraded) | 71.9 | 90 | 877,000 | 28.4 | 15.98 | None | 47 | 1590 |
| F | Hylon V | 53.1 | | 1,841,000 | 27.4 | 8.59 | None | 38 | 500 |
| G | Hylon V (degraded) | 52.0 | 18 | | 30.5 | 13.68 | None | 38 | 2150 |
| H | Corn Starch | 26% | | | 23.9 | 3.6 | None | 47 | 360 |
| I | Corn Starch | 26% | | | 24.1 | 3.4 | Dacrez ® 81[2] | 36 | 310 |

[1]Amylose content determined by Iodine binding analysis.
[2]Dacrez 81 is an acetone-formaldehyde water resistant additive used in the amount of 6.2% by wt. based on weight of total starch and provided by National Starch and Chemical Company.

TABLE 2

Wet & Dry Bond Strength

| Sample | Carrier Starch Type | Wet Bond Strength Application - lbs/MSF (1000 sq. ft.) 2.0 | Dry Bond Strength Application - lbs/MSF (1000 sq. ft.) 2.0 |
|---|---|---|---|
| A | AE High Amylose | 6.4 | 132 |
| B | Degraded Hylon VII | 6.3 | 145 |
| C | Degraded Hylon VII | 4.7 | 145 |
| D | 65/35 Blend of non-degraded Hylon VII (70% amylose) and degraded starch (65% amylose) | 2.7 | 135 |
| E | Hylon VII (non degraded) | 1.6 | 137 |
| F | Hylon V | 0 | 135 |
| G | Hylon V (degraded) | 0 | 151 |
| H | Corn Starch | 0 | 113 |
| I | Corn Starch (with water resistant additive) | 6.4 | 124 |

The results noted above show the beneficial effects regarding water resistance which are achieved when using the corrugating adhesives having the carrier starch components of this invention, especially Samples A, B and C as compared to those outside the invention i.e. Samples F and G which contain about 52% amylose and provide no water resistance and the corn starch Sample H and I where it is noted that water resistance is provided only when an acetone-formaldehyde crosslinking additive is included in the formulation.

What is claimed is:

1. A water resistant starch alkaline corrugating adhesive composition free of formaldehyde and other crosslinking and water resistance additives and comprising an aqueous dispersion of a gelatinized carrier starch and a raw ungelatinized starch wherein the carrier starch is a high amylose starch having greater than 60% by weight of total amylose content and the gelatinized starch amylose content is at least about 15% by weight of the total starch content in the adhesive.

2. The corrugating adhesive of claim 1 wherein the carrier starch has at least 70% by weight of total amylose content.

3. The corrugating adhesive of claim 2 wherein the gelatinized amylose content is from about 18 to 40% by weight of the total starch content in the adhesive.

4. The corrugating adhesive of claim 1 wherein the carrier starch has a weight average molecular weight of from about 300,000 to 1,200,000.

5. The corrugating adhesive of claim 4 wherein the carrier starch has at least 70% by weight of total amylose content.

6. The corrugating adhesive of claim 5 wherein the gelatinized amylose content is from about 18 to 40% by weight of the total starch content in the adhesive.

7. The corrugating adhesive of claim 1 wherein the carrier starch has an amylopectin content of less than about 30% and a low molecular weight amylose content of from about 5 to 30% as determined by butanol fractionation/exclusion chromatography measurement.

8. The corrugating adhesive of claim 7 wherein the carrier starch has at least 70% by weight total amylose content and the gelatinized amylose content is from about 18 to 40% by weight of the total starch content in the adhesive.

9. The corrugating adhesive of claim 8 wherein the carrier starch has a weight average molecular weight of from about 300,000 to 1,200,000.

10. The corrugating adhesive of claim 8 wherein the carrier starch has a weight average molecular weight of from about 500,000 to 850,000.

11. The corrugating adhesive of claim 1 wherein the carrier starch is a substantially pure starch extracted from a plant source having an amylose extender genotype, the starch comprising less than 10% amylopectin determined by butanol fractionation/exclusion chromatography measurement.

12. The corrugating adhesive of claim 11 wherein the carrier starch comprises at least 75% normal amylose and from about 8 to 25% low molecular weight amylose determined by butanol fractionation/exclusion chromatography measurement.

13. The corrugating adhesive of claim 1 wherein the carrier starch is a degraded starch.

14. The corrugating adhesive of claim 13 wherein the carrier starch has at least 70% by weight of total amylose content and the gelatinized amylose content is from about 18 to 40% by weight of the total starch content in the adhesive.

15. The corrugating adhesive of claim 1 wherein the carrier starch is a degraded starch produced in a process employing hydrogen peroxide and a catalytic amount of manganese ions in an alkaline slurry reaction.

16. The corrugating adhesive of claim 15 wherein the carrier starch has at least 70% by weight of total amylose content.

17. The corrugating adhesive of claim 15 wherein the carrier starch has an amylopectin content of less than about 30% and a low molecular weight amylose content of from about 5 to 30% by weight.

18. The corrugating adhesive of claim 17 wherein the carrier starch has a weight average molecular weight of from about 300,000 to 1,200,000 and the gelatinized amylose content is from about 18 to 40% by weight of the total starch content in the adhesive.

19. A water resistant starch alkaline corrugating adhesive composition free of formaldehyde and other crosslinking and water resistance additives comprising an ungelatinized starch which contains high amylose starch having greater than 60% by weight of total amylose content and present in sufficient amount to provide at least 15% by weight of amylose content based on the total starch content in the adhesive.

20. The corrugating adhesive of claim 19 wherein the high amylose starch has at least 70% by weight of total amylose content and a weight average molecular weight of from about 300,000 to 1,200,000.

21. The corrugating adhesive of claim 19 wherein the high amylose starch has an amylopectin content of less than about 30% and a low molecular weight amylose content of from about 5 to 30% as determined by butanol fractionation/exclusion chromatography measurement.

22. The corrugating adhesive of claim 19 wherein the high amylose starch is a substantially pure starch extracted from a plant source having an amylose genotype, the starch comprising less than 10% amylopectin determined by butanol fractionation/exclusion chromatography measurement.

23. The corrugating adhesive of claim 19 wherein the high amylose starch is a degraded starch.

24. A water resistant starch alkaline curing corrugating adhesive comprising:
   a. from about 10 to 50% by weight, based on the weight of the composition of starch including the ungelatinized raw and gelatinized carrier portions of the starch,
   b. from about 0.3 to 5% by weight, based on the weight of the starch, of an alkali, and
   c. from about 40 to 90% by weight, based on the weight of the composition of water, wherein the gelatinized carrier starch is a high amylose starch having greater than 60% by weight of total amylose content and the gelatinized starch amylose content is at least about 15% by weight of the total starch content in the adhesive.

25. The corrugating adhesive of claim 24 wherein the ratio of raw starch to carrier starch by weight will vary from about 1:1 to 10:1.

26. The corrugating adhesive of claim 25 wherein the carrier has at least 70% by weight of total amylose content.

27. The corrugating adhesive of claim 26 wherein the carrier starch is a substantially pure starch extracted from a plant source having an amylose extender genotype, the starch comprising less than 10% amylopectin determined by butanol fractionation/exclusion chromatography measurement.

28. The corrugating adhesive of claim 27 wherein the carrier starch comprises at least 75% normal amylose and from about 8 to 25% low molecular weight amylose determined by butanol fractionation/exclusion chromatography measurement.

29. The corrugating adhesive of claim 24 wherein the carrier starch is a degraded starch produced in a process employing hydrogen peroxide and a catalytic amount of manganese ions in an alkaline slurry reaction.

30. The corrugating adhesive of claim 29 herein the carrier starch has at least 70% by weight of total amylose content.

31. A water resistant starch alkaline curing corrugating adhesive comprising:
   a. from about 10 to 50% by weight, based on the weight of the composition of ungelatinized starch,
   b. from about 0.3 to 5% by weight, based on the weight of the starch, of an alkali, and
   c. from about 40 to 90% by weight, based on the weight of the composition of water, wherein the ungelatinized starch is high amylose starch having greater than 60% by weight of total amylose and is present in sufficient amount to provide at least 15% by weight of amylose content based on the total weight of starch.

32. The corrugating adhesive of claim 31 wherein the high amylose starch is a substantially pure starch extracted from a plant source having an amylose extender genotype, the starch comprising less than 10% amylopectin determined by butanol fractionation/exclusion chromatography measurement.

33. The corrugating adhesive of claim 31 wherein the high amylose starch is a degraded starch produced in a process employing hydrogen peroxide and a catalytic amount of manganese ions in an alkaline slurry reaction.

* * * * *